March 2, 1943.  G. A. LYON  2,312,568
WHEEL COVER STRUCTURE AND ASSEMBLY
Filed Jan. 20, 1940  2 Sheets-Sheet 2
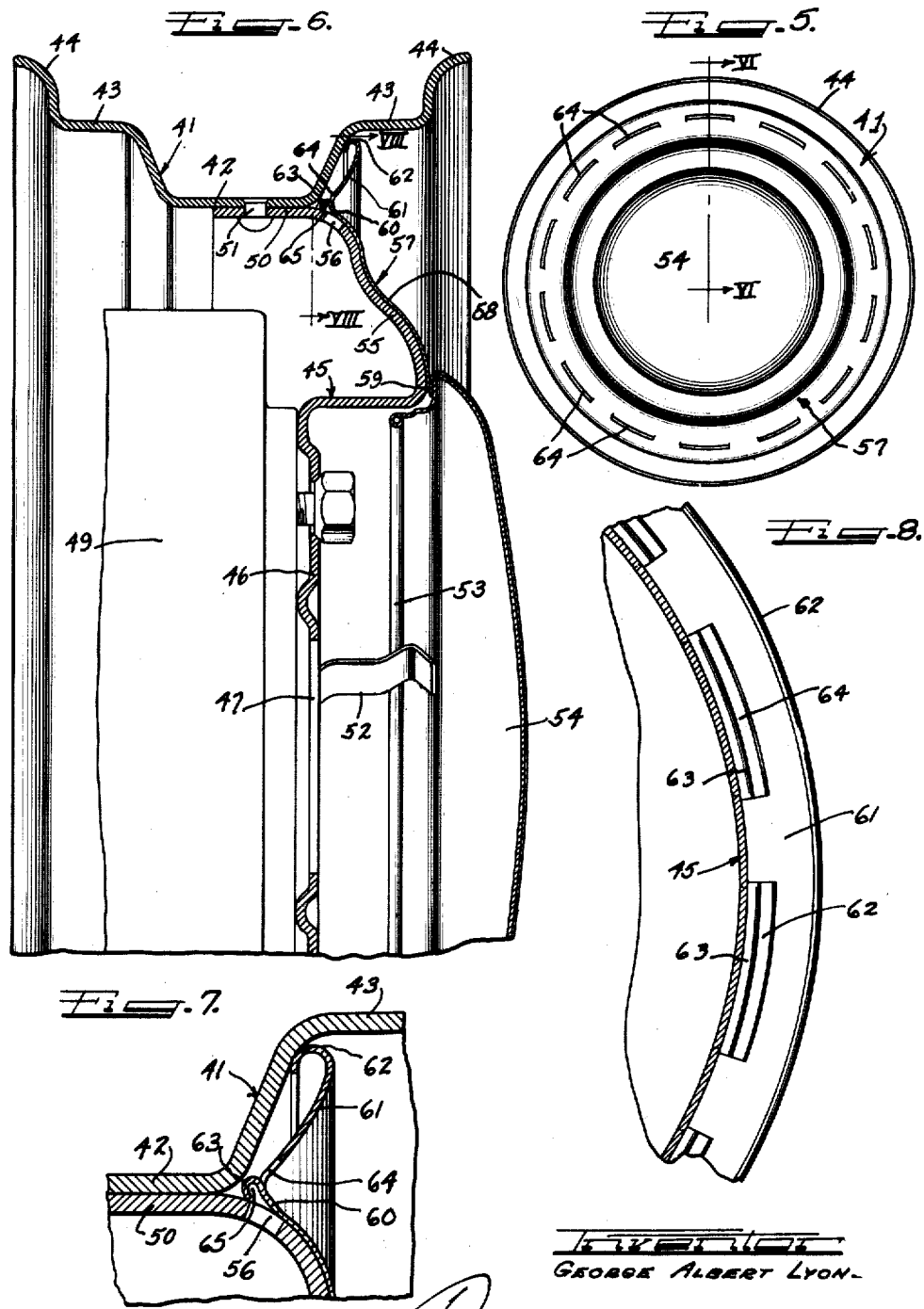

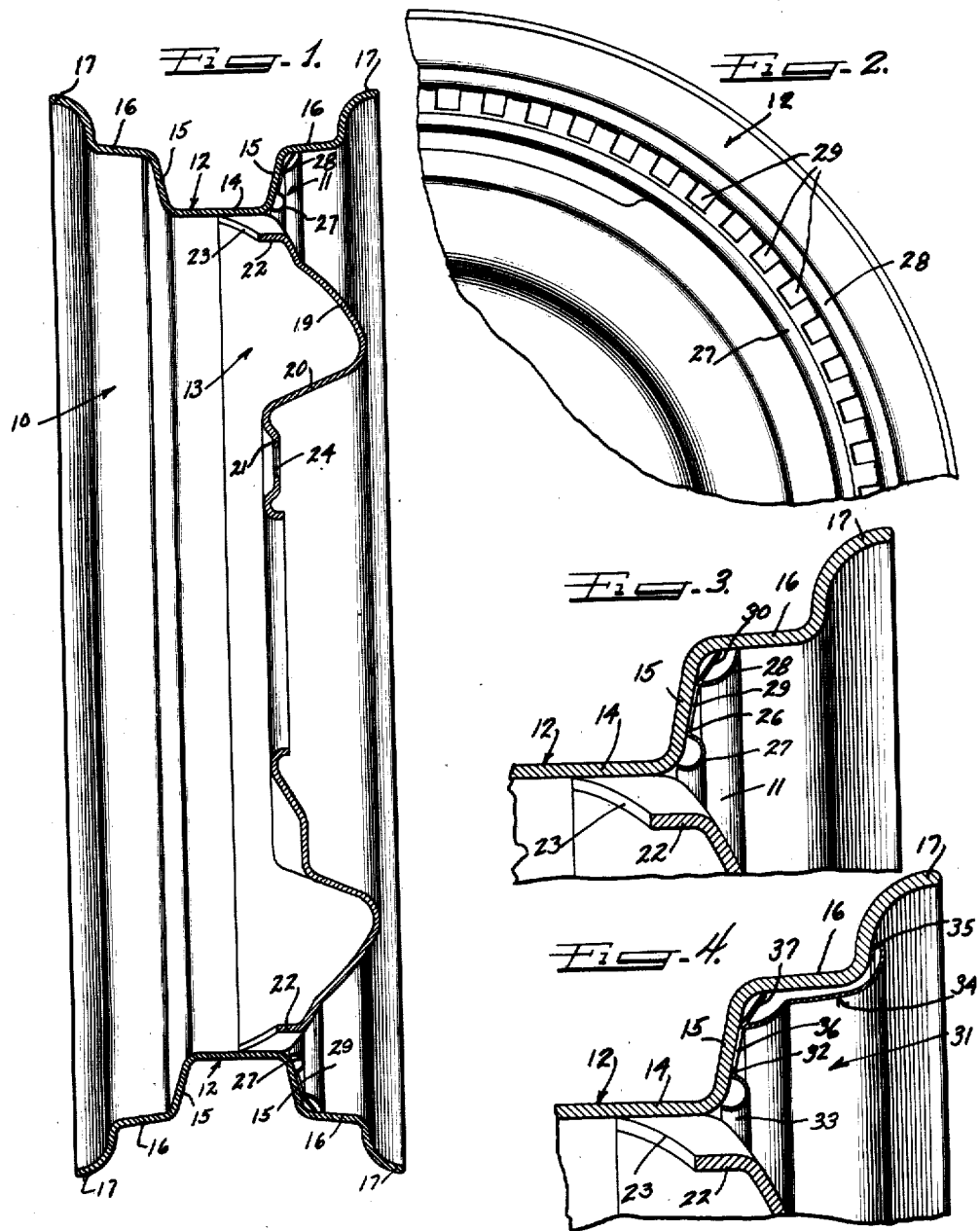

Patented Mar. 2, 1943

2,312,568

UNITED STATES PATENT OFFICE 2,312,568

WHEEL COVER STRUCTURE AND ASSEMBLY

George Albert Lyon, Allenhurst, N. J.

Application January 20, 1940, Serial No. 314,819

8 Claims. (Cl. 301—37)

This invention relates to a wheel cover structure and assembly, and more particularly to a novel wheel member or wheel cover which cooperates with a vehicle wheel in a novel manner and which has an annular series of openings therein through which a portion of the wheel may be seen.

This application is a continuation in part of my copending application for "Wheel disk structure," Serial No. 80,395, filed May 18, 1936, now matured into Patent No. 2,231,930, issued February 18, 1941.

The wheel cover structure or cover member may be in the form of a wheel disk or a trim ring. The wheel disk may either be in the form of an enlarged hub cap or it may be in the form of an annulus which partially covers the front face of a wheel.

The majority of vehicle wheels of today are equipped with ornamental wheel members or covers which extend over a portion of their outer surfaces. These wheel members or covers are usually provided with a highly polished exterior surface. It has been found desirable in certain instances to provide wheel cover structures or members having openings therein through which a portion of the wheel may be seen. It is an object of the present invention to provide a novel structure of this character which cooperates with and which is secured to the wheel in a novel manner.

Another object of the present invention is to provide a novel wheel cover structure or member having an annular series of openings therein formed by striking out an annular series of tangs from the member which tangs are bent back to form an attaching means for securing the member to the wheel.

A further object of the present invention is to provide a novel wheel member formed of relatively thin sheet material for disposition on one face of a wheel which is economical to manufacture which may be readily and quickly assembled on the wheel in substantially permanent engagement therewith and which is rugged and reliable in use.

A still further object of the present invention is to provide a novel wheel cover structure or member having an annular portion thereof lying in intimate contact with a face of a wheel on which the member is mounted, and which portion is provided with an annular series of openings through which the wheel may be seen.

Another and still further object of the invention is the provision of a wheel disk having underturned means for bitingly engaging the wheel adjacent ventilation openings in the wheel, the disk also having ventilation openings therein adjacent the means in communication with the openings on the wheel.

It is also a feature of this invention to provide a wheel cover member or wheel disk for use on a wheel having ventilation openings, in which the disk extends over the side surface of the wheel in both directions beyond the openings on the wheel, the disk being provided with a series of openings adjacent those on the wheel to form an ornamental appearance on the disk and also to permit circulation of air through the disk and the wheel.

A further object of this invention resides in the provision of a wheel cover member or disk wherein the ventilation openings in the member are formed by striking toothlike elements from the member for biting engagement with the wheel to hold the member thereon.

The novel features which I believe to be characteristic of my invention are set forth with particularity in the appended claims. My invention itself, however, both as to its organization and manner of construction, together with further objects and advantages thereof, may best be understood by reference to the following description taken in connection with the accompanying drawings, in which:

Figure 1 is a vertical sectional view of a vehicle wheel and cover assembly;

Figure 2 is a fragmentary front view of a portion of the wheel and wheel cover assembly;

Figure 3 is an enlarged fragmentary sectional view showing the upper portion of the wheel and wheel cover assembly in Figure 1;

Figure 4 is a fragmentary sectional view similar to Figure 3 showing a modified form of the present invention;

Figure 5 is a front elevational view of a vehicle wheel and cover assembly illustrating a different embodiment of the present invention;

Figure 6 is an enlarged fragmentary vertical sectional view, with parts in elevation, of the wheel and cover assembly shown in Figure 5 and as viewed along the line VI—VI of Figure 5;

Figure 7 is an enlarged fragmentary sectional view of the upper end portion of Figure 6; and Figure 8 is a fragmentary sectional view taken substantially as indicated by the staggered section line VIII—VIII of Figure 6.

Referring now to the embodiment of the present invention which is illustrated in Figures 1, 2 and 3, there is shown a wheel assembly comprising a vehicle wheel 10 and a wheel cover or trim ring 11. The wheel 10 comprises a rim part 12 and a body part 13. The rim 12 is of the usual drop center type and includes a base flange 14, opposite intermediate side flanges 15 opposite intermediate base flanges 16 and opposite edge portions 17. The drop center rim 12 as illustrated is of the type commonly employed in the automotive vehicle art of the present day, and, as is well known to those skilled in the art, is arranged to receive and accommodate a pneumatic tire (not shown).

The body part 13 and wheel 10 includes, in general, a rearwardly extending outer flange 18, an outer web portion 19, a generally axially rearwardly and slightly radially inwardly extending inner web portion 20, and a radially inwardly extending wheel mounting flange 21. The rearwardly extending outer flange 18 is secured to the underside of the base flange 14 of the rim 12 in any suitable manner, such as by welding or riveting (not shown). The circumferentially spaced portions of the flange 18 are depressed radially inwardly as at 22 to permit circulation of air through the wheel. The rear edges 23 of the depressed portion 22 are cut back as is clearly shown in Figure 1 of the drawings.

The wheel mounting flange 21 is provided with an annular series of apertures 24 for the reception of the usual wheel mounting bolts (not shown), which bolts are arranged to extend therethrough and to engagement with the hub portion or brake drum of the vehicle (not shown).

The wheel cover or trim ring 11 includes a principal body portion 26 which is seated on and lies in intimate contact with the intermediate side flange 15 of the rim 12 and inner and outer beaded marginal portions 27 and 28 respectively. The principal body portion 26 has an annular series of apertures 29 (see Figure 2) formed therein by striking out tangs 30. These tangs or toothlike projections 30 are bent to extend obliquely radially outwardly and axially forwardly of the wheel and in such a position are disposed behind the outer beaded portion 28 as is clearly shown in Figures 1 and 3.

The tangs or toothlike projections 30 are of such length that when the trim ring 11 is forced onto the wheel 10, the tangs or toothlike projections 30 make a biting engagement with the intermediate base flange 16 of the rim 12. An examination of Figure 3 will show that any tendency for the trim ring 11 to became dislodged from the wheel 10 will only cause the tangs or finger-like projections 30 to bite more deeply into the metal in the rim 12. It will thus be understood that the trim ring 11 is ruggedly mounted on and secured to the wheel 10 for it is only by rupturing or partially rupturing or bending the fingers or tangs 30 that the trim ring 11 may be removed from the wheel 10 after it has once been mounted thereon.

It will further be observed that the annular series of openings 29 in the trim ring 11 permit portions of the front face of the wheel to be seen. This provides a very striking ornamental appearance since the trim ring 11 may be given a highly polished exterior finish and the intermediate flange 15 of the rim 12 may be enamelled any suitable color which provides a striking contrast to the highly polished exterior surface of the trim ring 11 when viewed through the openings 29. The trim 11 may of course be enamelled or otherwise painted and the portion of the wheel surface which is exposed through the openings 29 may be highly polished instead or both the trim ring 11 and the wheel 10 may be painted or enamelled.

In Figure 4 of the drawings I have illustrated a modification of the trim ring shown in Figures 1 to 3. More particularly, a trim ring 31 is provided having a principal body portion 32 which is seated on and lies in intimate contact with the intermediate side flange 15 of the rim 12. The trim ring 31 also includes an inner beaded portion 33 and an outer extended marginal portion 34. This extended marginal portion 34, instead of being a simple bead as is shown in Figures 1 to 3, is arranged to extend radially inwardly of the intermediate base flange 16 of the rim 12 and around the outer corner thereof into engagement with the outer edge portion 17 of the rim 12. The radial outer edge of the marginal portion 34 of the trim ring 31 is inturned as at 35.

The principal body portion 32 of the trim ring 31 is provided with an annular series of apertures 36 which will form by striking out tangs 37. These tangs or toothlike projections are bent around to extend obliquely radially outwardly and axially forwardly of the wheel and are of such length that when the trim ring 31 is mounted on the wheel 10 the tangs or fingerlike projections 37 extend into biting engagement with the intermediate base flange 16 of the rim 12.

In Figures 5 to 8 of the drawings I have illustrated a different embodiment of the present invention which is shown mounted on a vehicle wheel including a rim of the drop center type, generally indicated by the numeral 41, comprising a base flange 42, intermediate flanges 43—43, and side edges 44—44, all integrally connected in the usual manner.

The wheel also includes a body part, generally indicated by the numeral 45, which is provided with the usual fastening flange 46, apertured as at 47 to provide a hub opening for the wheel. Outside the hub opening, the flange 46 is also provided with a series of apertures for the accommodation of fastening means, such as bolts 48, by means of which the wheel may be fastened to a vehicle part, such as a brake drum 49 or a spare wheel carrier, as the case may be. The outer portion of the body part is turned inwardly to form a flange 50 attached to the base flange of the rim in any suitable manner, such as by rivets 51. This body part is further provided with a plurality of resilient retaining elements 52 projecting substantially in an axial direction from the wheel for engagement in snap-on fashion over the inner rolled edge 53 of a hub cap 54.

Between the fastening flange 46 and the rim engaging flange 50, a body part is provided with a tortuous of varying configuration, as indicated at 55, terminating in a shoulder against which a part of the hub cap rests. Adjacent the rim, preferably in that region where the varying part 55 merges into the flange 10, the body part is provided with an annular series of elongated apertures 56 providing openings through which air may freely circulate to cool the brake drum 49.

The wheel disk which is shown in Figures 5, 6 and 7 includes a disk part or annulus 57, preferably made of metallic sheet material and includes a body portion 58 which intimately overlies the tortuous surface of the body part 55. The disk is substantially in the form of an annulus and extends as is indicated at 59 beneath the hub cap 54, which aids in holding this part of the disk in tight cooperation with the wheel.

The disk 57 is provided with an annular groove or indentation 60 adjacent the junction point between the wheel body and wheel rim, and outwardly beyond this indentation, the disk is shaped in the form of an apron 61 overlying a part of the wheel rim and terminating in an inwardly turned or curled margin 62 for contact with the wheel rim.

In the region of the annular indentation 60, the disk is provided with a plurality of underturned toothlike projections 63 for biting engagement with the body part of the wheel. The biting projection of the toothlike elements or projections 63 is preferably made immediately adjacent the series of apertures 56 in the body part of the wheel. It will also be noted from an inspection of Figure 8 that each projection 63 is preferably of such size as to extend beyond the adjacent aperture or opening 56 so that it is impossible for the projection to catch inside the opening when placing the disk upon the wheel. These projections are integral with the disk and are preferably struck directly from the disk leaving a plurality of openings 64 in the disk.

As may be best seen in Figure 7, the projections 63 are underturned in the manner of an inverted U to provide an interior passage 65 which establishes communication in each instance between the openings 64 in the disk and the corresponding openings 56 in the wheel.

It will be noted that the projections 63 are of such size as to extend beyond the openings 56 in the wheel, and that while the openings 64 in the disk are substantially in alignment with the openings 56 of the wheel, nevertheless a rather tortuous passage is effected by means of the projections 63 so that it is difficult for dirt or debris to find its way through the wheel.

With reference to Figure 5, it will be seen that while the openings 64 in the disk are visible from the outer side of the disk, the present arrangement is such that these openings do not detract from the appearance of the wheel but rather enhance the general appearance. In other words, the annular series of openings 64 permit portions of the wheel to be seen through the disk or annulus. Since the disk or annulus is preferably made with a highly polished exterior surface it will be understood that by painting the wheel with an enamel or the like behind the openings 64 in the disk 57 a distinctive contrast may be made with the highly polished exterior surface of the disk 57. This provides a wheel of very striking appearance.

While I have shown particular embodiments of my invention, it will, of course, be understood that I do not wish to be limited thereto, since many modifications may be made, and I therefore contemplate by the appended claims to cover all such modifications as fall within the true spirit and scope of my invention.

I claim as my invention:

1. In a vehicle wheel and ornamental member assembly the combination comprising a wheel having rim and body parts and a trim ring mounted on said rim part, said trim ring including an annular portion seated on and lying in intimate contact with one face of said rim part and a marginal portion of arcuate cross-section, said annular portion of said trim ring having a plurality of attaching fingers struck therefrom and bent back to extend obliquely axially forwardly behind said marginal portion and into biting engagement with said wheel, said trim ring having an annular series of apertures therein where said attaching fingers have been struck therefrom through which portions of said wheel may be seen.

2. In a vehicle wheel and ornamental member assembly, the combination comprising a wheel having rim and body parts and an ornamental sheet member for disposition on the outer face of the wheel, said sheet metal member having an annular series of attaching fingers struck therefrom and bent back behind said member to extend obliquely axially forwardly into biting engagement with said wheel, whereby said member is substantially permanently mounted on said wheel, said member having an annular series of apertures therein where said attaching fingers have been struck therefrom through which portions of the wheel may be seen.

3. In a vehicle wheel and ornamental member assembly, the combination comprising a wheel having rim and body parts and an ornamental annulus mounted on the outer face of said wheel and extending over a portion of said rim part and over a portion of said body part, said ornamental annulus having a plurality of attaching ears struck therefrom and bent back on said annulus to extend obliquely radially inwardly and axially forwardly into biting engagement with said body part of said wheel, said ears being struck from said ornamental annulus in an annular region lying opposite said rim part whereby an annular series of apertures are provided in said annulus through which portions of said rim part may be seen.

4. In a vehicle wheel and ornamental member assembly, the combination comprising a wheel and an ornamental annulus mounted on the outer face thereof, said annulus including an annular portion seated on and lying in intimate contact with an adjacent portion of said wheel, said annular portion of said annulus having a plurality of attaching fingers struck therefrom and bent back to provide an annular series of openings through which portions of said wheel may be seen, said fingers being shaped to retain said annulus on said wheel.

5. In combination, a wheel having a metallic rim and a metallic body part with openings in said body part adjacent the rim to permit air circulation through the wheel, and an ornamental disk having means on the inner side thereof for bitingly engaging the wheel adjacent said openings, and said disk also having openings therein disposed immediately above said biting means in communication with the openings in the wheel, said disk extending radially beyond the openings in the wheel.

6. As an article of manufacture, an ornamental disk for disposition over the side surface of a vehicle wheel, said disk being formed of sheet material and including inwardly turned toothlike portions arranged for biting engagement with an outer relatively smooth surface of the body part of the wheel near the rim of the wheel, said disk being provided with ventilation openings spaced radially outwardly of said tooth-like portions.

7. As an article of manufacture, an ornamental disk for disposition over the outer side surface of a metallic vehicle wheel, said disk being made of sheet material and arranged to overlie both the body and rim parts of the wheel, and radially inwardly turned tooth-like projections struck from said disk at points spaced inwardly from the outer edge thereof for biting engagement with the body part of the wheel adjacent the rim to hold the disk on the wheel, the openings left by the formation of said projections affording ventilation therethrough for the brake drum of the wheel.

8. As an article of manufacture, an ornamental disk for overlying the outer side surface of a vehicle wheel provided with openings for brake drum ventilation, said disk being made of sheet material and having a plurality of spaced radially inwardly turned tooth-like elements struck from the disk proper at points spaced inwardly from the outer edge in an intermediate part to provide means to hold the disk on the wheel and also provide a series of openings for communication with the openings in the wheel.

GEORGE ALBERT LYON.